United States Patent Office
3,823,239
Patented July 9, 1974

3,823,239
ANTI-BACTERIAL PROCESS USING TETRAMISOLE
Roland Thomas Victor Fox, Wokingham, John Roger Hadfield, Yateley, and Peter Doyle, Macclesfield, England, assignors to Imperial Chemical Industries Limited, London, England
No Drawing. Filed Sept. 1, 1972, Ser. No. 285,809
Claims priority, application Great Britain, Sept. 30, 1971, 45,562/71
Int. Cl. A01n 9/12, 9/20
U.S. Cl. 424—270    3 Claims

ABSTRACT OF THE DISCLOSURE

This invention relates to processes for combating plant bacterial diseases using a compound having the formula:

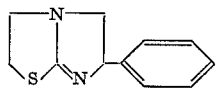

or acid-addition salts thereof.

---

In British Patent Specification No. 1,043,489 and Belgian Pats. Nos. 764,755 and 773,062 there is disclosed a group of compounds which are derivatives of imidazo-[2,1-b]thiazoles and these compounds, and salts thereof, are useful as anthelmintic agents. In an article in Nature, 1966, 209, 1084–1086, one of these compounds, is further described. It is stated in this article (at page 1086) that this important anthelmintic agent, known as tetramisole British Standard Common Name for 2,3,5,6-tetrahydro - 6 - phenyl-imidazo[2,1-b]thiazole hydrochloride is "devoid of antibacterial activity." This compound falls within the class of compounds defined in the aforesaid British Patent Specification.

We have now found, most surprisingly and remarkably, that tetramisole is effective in combating bacteria which harm plant life. It may be used either as the free base or in the form of a salt thereof; such salts may be formed with organic or inorganic acids, the former displaying relatively low phytotoxicity towards plants in comparison with other salts and with the parent compounds per se.

This invention, therefore, provides a process for combating bacteria which comprises treating plants or seeds with a compound having the formula:

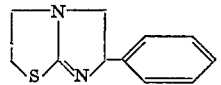

or a salt thereof.

The numbering of the atoms in the ring is as follows:

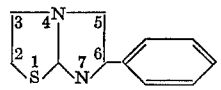

The compound useful in the invention process is therefore an imidazo[2,1-b]thiazole derivative.

Particularly preferred agents for combating plant bacterial diseases are the compounds tetramisole, its free base, and salts thereof, especially acid addition salts of the free base.

Examples of preferred salts of the anti-bacterial compounds include, for example, acid addition salts of both organic and inorganic acids.

Thus the invention embraces the use as plant antibacterial agents of acid addition salts of tetramisole free base prepared simply by treatment of the compound with an organic acid such as acetic, propionic, glycolic, lactic pyruvic, oxalic, malonic, succinic, maleic, fumaric, malic, tartaric, citric, benzoic, cinnamic, mandelic, methanesulfonic, p-toluenesulfonic, salicylic, p-aminosalicylic, 2-phenoxybenzoic or 2-acetoxybenzoic acid, or by treatment of the compound with an inorganic acid such as a hydrochloric hydrobromic, hydroiodic, sulphuric, nitric, thiocyanic, or phosphoric acid.

The process of this invention may be modified if desired by applying the active agent or a salt thereof, in admixture with other plant antibacterial agents, for example streptomycin.

It is to be understood that references to anti-bacterial compounds recited in this specification include not only the racemic forms of tetramisole but also its optical isomers, individually and in admixture. Thus the invention includes processes of combating plant bacteria, and compositions therefor, using tetramisole in either its d or l forms, or mixtures thereof.

The bacterial diseases which can be combated in vivo by the invention process include diseases arising from the following specific organisms:

Corynebacterium michiganense ___ Canker of tomatoes.
Xanthomonas malvacearum _____ Blackarm of cotton.
Erwinia amylovora _____ Fire blight of pears and apples.
Pseudomonas phaseolicola _____ Halo blight of beans.
Xanthomonas vesicatoria _____ Bacterial leaf spot of tomato.
Xanthomonas oryzae _____ Bacterial leaf blight of rice.

A particularly useful feature of the activity of the plant anti-bacterial agent tetramisole is its ability to act as a systemic bactericide, that is to say, its ability to move in a plant to combat an infection or infestation thereon remote from a site of initial application of an agent. Thus the agent, or a composition containing the same, may be applied to the soil surrounding the roots of a plant and be taken up by the plant through its roots to combat bacterial disease on the plant.

In use the plant antibacterial agent may be applied as such or as simple solutions, e.g. of its salts. Preferably however, it is formulated into compositions using for example, an adjuvant such as an inert diluent or carrier.

In a further aspect, therefore, this invention provides a plant anti-bacterial composition comprising as an active ingredient or agent, tetramisole or other salt of the free base thereof, if desired in the presence of a carrier.

In a still further aspect the invention provides a plant anti-bacterial composition comprising, as an active agent, an organic acid addition salt of tetramisole free base as defined in any of the paragraphs hereinabove.

The active agent, and compositions containing it can be used to combat plant bacteria and treat plants or seeds in a number of ways. Thus they can be applied directly to the foliage of an infected plant (that is to a seedling, bush or tree), to seeds or to other propagative parts of plants, or to the soil or other medium in which plants are growing or to be planted. They can be sprayed on or dusted on or applied as a paste or cream formulation. All these modes of application are deemed to fall within the scope of the expression "treating" used hereinabove. The invention thus embraces both protectant (i.e. prophylactic) and eradicant treatment. The particular type of composition used in any instance will depend upon the particular purpose for which it is to be used.

The invention compositions may be in the form of dusting powders or granules wherein the active ingredient is mixed with a solid diluent or carrier. Suitable solid diluents or carriers may be, for example, kaolinite (china clay) montmorillonite, attapulgite, talc, pumice, silica, calcium carbonate, gypsum, powdered magnesia, Fuller's earth, Hewitt's earth and diatomaceous earth. Compositions for dressing seed, for example, may comprise an agent assisting the adhesion of the composition to the seed, for example, a mineral oil.

The compositions may also be in the form of dispersible powders or grains comprising, in addition to the active ingredient, a wetting agent to facilitate the dispersion of the powder or grains in liquids. Such powders or grain may include fillers, suspending agents and the like.

The compositions may also be in the form of liquid preparations to be used as dips or sprays which are generally aqueous dispersions or emulsions containing the active ingredient in the presence of one or more wetting agents, dispersing agents, emulsifying agents or suspending agents.

Wetting agents, dispersing agents and emulsifying agents may be of the cationic, anionic, or non-ionic type. Suitable agents of the cationic type include, for example, quaternary ammonium compounds, for example, cetyltrimethylammonium bromide. Suitable agents of the anionic type include, for example, soaps, salts of aliphatic monoesters of sulphuric acid, for example sodium lauryl sulphate, salts of sulphonated aromatic compounds, for example sodium dodecylbenzenesulphonate, sodium, calcium or ammonium lignosulphonate, butyl-naphthalene sulphonate, and a mixture of the sodium salts of diisopropyl and triisopropyl naphthalene sulphonic acids.

Suitable agents of the non-ionic type include, for example the condensation products of ethylene oxide with fatty alcohols such as oleyl alcohol or cetyl alcohol, or with alkyl phenols such as octylphenol, nonylcresol. Other non-ionic agents are the partial esters derived from long chain fatty acids and hexitol anhydrides, the condensation products of the said partial esters with ethylene oxide, the lecithins, and block copolymers of ethylene oxide and propylene oxide.

Suitable suspending agents are, for example, bentonite, pyrogenic silica, and hydrophilic colloids, for example polyvinyl-pyrrolidone and sodium carboxymethylcellulose, and the vegetable gums, for example gum acacia and gum tragacanth.

The aqueous solutions dispersions or emulsions may be prepared by dissolving the active ingredient or ingredients in an organic solvent which may contain one or more wetting, dispersing or emulsifying agents and then adding the mixture so obtained to water which may likewise contain one or more wetting, dispersing or emulsifying agents. Suitable organic solvents are ethylene dichloride, isopropyl alcohol, propylene glycol, diacetone alcohol, toluene, kerosene, methylnaphthalene, xylenes and trichloroethylene.

The active ingredients may also be formulated into compositions comprising capsules or microcapsules containing either the active ingredient itself, or a composition containing the active ingredient, and prepared by any of the known encapsulation or microencapsulation techniques.

The compositions to be used as sprays may also be in the form of aerosols wherein the formulation is held in a container under pressure in the presence of a propellant such as fluorotrichloromethane or dichlorodifluoromethane.

By the inclusion of suitable additives, for example, for improving the distribution, adhesive powder and resistance to rain on treated surfaces, the different compositions can be better adapted for the various uses for which they are intended. The active ingredients of this invention as hereinbefore defined may also be conveniently formulated by admixing them with fertilizers. A preferred composition of this type comprises granules of fertilizer material incorporating, for example coated with, an active ingredient. The fertilizer material may, for example, comprise nitrogen or phosphate-containing substances.

In yet a further aspect of the invention, therefore, we provide a fertilizer comprising an active ingredient as hereinbefore defined.

The compositions which are to be used in the form of aqueous dispersions or emulsions are generally supplied in the form of a concentrate containing a high proportion of the active ingredient or ingredients, the said concentrate to be diluted with water before use.

These concentrates are often required to withstand storage for prolonged periods and after such storage, to be capable of dilution with water in order to form aqueous preparations which remain homogeneous for a sufficient time to enable them to be applied by conventional spray equipment. The concentrates may conveniently contain from 10–85% by weight of the active ingredient or ingredients and generally from 25–60% by weight of the active ingredient or ingredients. When diluted to form aqueous preparations, such preparations may contain varying amounts of the active ingredient or ingredients depending upon the purpose for which they are to be used, but an aqueous preparation containing between 0.01% and 10% by weight of active ingredient or ingredients may be used.

It is to be understood that the anti-bacterial compositions of this invention may comprise, in addition to an active ingredient as hereinbefore defined, one or more other compounds having similar, or any other biological activity. Thus the agents used may include a thiadiazole or streptomycin; or a compound acting in synergistic conjunction with the agent.

The application of the anti-bacterial compounds according to the process of the invention may be carried out in a variety of ways depending *inter alia* upon the identity of the disease to be combatted, and the situation in which it is encountered. For example, plants infected with disease or liable to infection may be sprayed with or dipped into compositions containing an active compound. Woody and herbaceous plants may, for example, be painted or injected with such a composition or treated with a grease, paste or cream formulation containing the active agent. Such paint and grease formulations may be particularly useful for application to cut wounds and galls on plants. Plant seeds may be soaked in aqueous compositions containing an active agent or treated with seed dressings comprising a dispersion of the active agent in a solid diluent, for example kaolin.

The following Examples illustrate the antibacterial processes of this invention and compositions therefor. In these Examples the streptomycin used was in the form of a commercial formulation containing 15% of streptomycin and 1.5% of oxytetracycline. This material is presently used commercially for the control of bacterial diseases of plants.

EXAMPLE 1

This example illustrates the control of various plant bacterial diseases according to the invention processes. The procedure for each disease is described below and thereafter, in Table 2, are set out the results. The actual compounds used are set out and numbered in Table I immediately preceding Table 2.

Test Procedure for *Erwinia amylovaro* (fireblight of pears)

Pear seedlings grown in 2 inch pots were treated with a root drench (5 ml. containing the chemicals in Table 1 below. A further group of seedlings was treated with a root drench (5 mls.) containing streptomycin (1000 parts per million). Twenty four hours later, both groups of plants were inoculated with *Erwinia amylovora* by applying a suspension of cells of this bacterium to wounds made in the seedlings. After two weeks the condition of the pear seedlings was assessed on a 0–3 scale. Where 0 is no control, 1 is slight control, 2 is fair control and 3 is complete control. Phytotoxicity is assessed on a scale 0 to 5 where 0 is no phytotoxicity and 5 severe damage. The results illustrate the systemic protectant effect of the compounds in Table 1. The mean results are recorded in Table 2.

Test Procedure for *Corynebacterium michiganense* (tomato canker)

Tomato seedlings grown in 2 inch pots were treated with a root drench (5 ml.) containing the chemicals in Table 1. A further group of seedlings was treated with a root drench (5 ml.) containing streptomycin (1000 p.p.m.). Twenty four hours later the seedlings were inoculated with *Corynebacterium michiganense* by applying a suspension of cells of this bacterium to wounds made in the seedlings.

After three weeks the condition of the tomato seedlings was assessed on a 0–3 scale. Where 0 is no control, 1 is slight control, 2 is fair control and 3 is complete control. Phytotoxicity was assessed on a 0–5 scale where 0 is no phytotoxicity and 5 is severe damage. The mean results are recorded in Table 2. These results confirm the systemic protectant effect of the compounds in Table 1.

Test Procedure for *Xanthomonas malvacearum* (black arm on cotton)

Cotton seedlings grown in 2 inch pots were treated with a root drench (5 ml.), containing the chemicals in Table 1. A further group of seedlings was treated with a root drench (5 ml.) containing streptomycin (1000 p.p.m.). Twenty four hours later the seedlings were inoculated with *Xanthomonas malvacearum* by spraying a suspension of cells of this bacterium on to the seedlings to run off.

After two weeks under 100% relative humidity the condition of the cotyledons and leaves of the cotton seedlings was assessed on a 0–3 scale. Where 0 is no control, 1 is slight control, 2 is fair control and 3 is complete control. Phytotoxicity was assessed on a 0–5 scale, where 0 is no phytotoxicity and 5 is severe damage. The mean results are recorded in Table 2. These results again confirm the systemic effect of the compounds in Table 1.

Test Procedure for *Pseudomonas phaseolicola* (haloblight)

French bean seedlings grown in 2 inch pots were treated with root drenches (5 ml.) containing the chemicals in Table 1. A further group of seedlings was treated with a root drench (5 ml.) containing streptomycin (1000 p.p.m.). Twenty four hours later the seedlings were inoculated with *Pseudomonas phaseolicola* by applying a suspension of cells of this bacterium on to the seedlings to run off.

After two weeks under 100% relative humidity the trifoliate leaves were assessed for haloblight symptoms on a 0–3 basis, where 0 is no control and 3 complete control. Phytotoxicity was assessed on a 0–5 scale where 0 is no phytotoxicity and 5 is severe damage. The mean results are recorded in Table 2. This result again confirms the systemic effect of the compounds of Table 1.

Test Procedure to determine phytotoxicity

This example illustrates the lack of phytotoxicity on rice seedlings of several compounds in Table 1. Rice seedlings at the three leaf stage were root drenched (0.5 ml.) with chemicals in Table 1. After 14 days at 100% relative humidity the seedlings were assessed on a 0–5 scale for phytotoxicity symptoms. 0 is no phytotoxicity, 5 is severe damage. Results are expressed in Table 2.

TABLE 1

| Compound number | Structural formula |
|---|---|
| 1 | dl racemate free base (tetramisole free base). |
| 2 | dl racemate hydrochloride salt (tetramisole). |
| 3 | d isomer hydrochloride salt. |
| 4 | l isomer hydrochloride salt. |
| 5 | dl racemate oxalate salt. |
| 6 | dl racemate citrate salt. |
| 7 | dl racemate tartrate salt. |

TABLE 2

| Compound number Table 1 | Rate, p.p.m. | Antibacterial Activity | | | | Phytotoxicity | | | | |
|---|---|---|---|---|---|---|---|---|---|---|
| | | Fireblight (*Erwinia amylovora*) | Tomato canker (*Corynebacterium michiganense*) | Cotton black arm (*Xanthomonas malvacearum*) | Haloblight of bean (*Pseudomonas phaseolicola*) | Pears | Tomato | Cotton | French bean | Rice |
| 1 | 5,000 | 1 | 0 | 1 | 0 | 0 | 3 | 0 | 3 | 4 |
| | 2,000 | 1 | 0 | 2 | 0 | 0 | 0 | 0 | 0 | 3 |
| | 1,000 | 3 | 0 | 1 | 1 | 0 | 0 | 0 | 0 | 2 |
| | 500 | 1 | 1 | 2 | 1 | 0 | 0 | 0 | 0 | 1 |
| | 100 | 0 | 1 | 1 | 0 | 0 | 0 | 0 | 0 | 1 |
| 2 | 5,000 | 1 | 3 | 1 | 0 | 0 | 3 | 1 | 3 | 4 |
| | 2,000 | 1 | 1 | 2 | 0 | 0 | 0 | 1 | 0 | 3 |
| | 1,000 | 0 | | 3 | 0 | 0 | 0 | 0 | 0 | 2 |
| | 500 | 3 | 2 | 2 | 0 | 0 | 0 | 0 | 0 | 0 |
| | 100 | 0 | 1 | 2 | 0 | 0 | 0 | 0 | 0 | 1 |
| 3 | 5,000 | 1 | 0 | 2 | 1 | 0 | 3 | 0 | 3 | 4 |
| | 2,000 | 1 | 0 | 3 | 0 | 0 | 1 | 0 | 1 | 2 |
| | 1,000 | 2 | 0 | 1 | 0 | 0 | 0 | 0 | 0 | 2 |
| | 500 | 1 | 0 | 2 | 1 | 0 | 1 | 0 | 0 | 1 |
| | 100 | 3 | 0 | 2 | 1 | 0 | 0 | 0 | 0 | 1 |

TABLE 2—Continued

| Compound number Table 1 | Rate, p.p.m. | Antibacterial Activity | | | | Phytotoxicity | | | | |
|---|---|---|---|---|---|---|---|---|---|---|
| | | Fireblight (*Erwinia amylovora*) | Tomato canker (*Corynebacterium michiganense*) | Cotton black arm (*Xanthomonas malvacearum*) | Haloblight of bean (*Pseudomonas phaseolicola*) | Pears | Tomato | Cotton | French bean | Rice |
| 4 | 5,000 | 2 | 0 | 1 | 0 | 0 | 3 | 3 | 2 | 4 |
|   | 2,000 | 1 | 0 | 2 | 0 | 0 | 2 | 1 | 0 | 4 |
|   | 1,000 | 1 | 1 | 2 | 0 | 0 | 0 | 0 | 0 | 2 |
|   | 500 | 0 | 0 | 2 | 1 | 0 | 0 | 0 | 0 | 1 |
|   | 100 | 0 | 0 | 2 | 1 | 0 | 0 | 0 | 0 | 0 |
| 5 | 1,000 | 3 | 0 | 2 | 1 | 0 | 0 | 0 | 0 | 2 |
|   | 500 | 1 | 0 | 1 | 0 | 0 | 0 | 0 | 0 | 1 |
|   | 100 | 1 | 0 | 1 | 0 | 0 | 0 | 0 | 0 | 1 |
| 6 | 1,000 | 3 | 0 | 1 | 1 | 0 | 0 | 0 | 0 | 0 |
|   | 500 | 2 | 1 | 1 | 3 | 0 | 0 | 0 | 0 | 0 |
|   | 100 | 0 | 0 | | | 0 | 0 | 0 | 0 | 0 |
| 7 | 1,000 | 0 | 2 | 1 | 0 | 0 | 1 | 0 | 0 | 2 |
|   | 500 | 0 | 0 | 1 | 0 | 0 | 0 | 0 | 0 | 0 |
|   | 100 | 0 | 0 | 1 | 0 | 0 | 0 | 0 | 0 | 0 |
| Streptomycin ("Agrimycin") | 5,000 | 1 | 3 | 0 | 0 | 0 | 0 | 0 | 0 | 0 |
|   | 2,000 | 0 | 1 | 0 | 0 | 0 | 0 | 0 | 0 | 0 |
|   | 1,000 | 1 | 0 | 0 | 0 | 0 | 0 | 0 | 0 | 0 |
|   | 500 | 2 | 0 | 0 | 0 | 0 | 0 | 0 | 0 | 0 |
|   | 100 | 1 | 1 | 0 | 0 | 0 | 0 | 0 | 0 | 0 |
| Untreated control | | 0 | 0 | 0 | 0 | 0 | 0 | 0 | 0 | 0 |

The above results, although variable as is normally the case with glasshouse in vivo tests, illustrate with considerable clarity the improved activity of the plant antibacterial agents, defined as hereinbefore set forth, over streptomycin which is presently a well-known commercially available substance for combating plant bacterial diseases. The results also show the lower phytotoxicity towards the plants being treated exhibited by the organic acid salts Nos. 5, 6 and 7 of Table 1.

In a series of field trials the efficacy of tetramisole was variously compared with Streptomycin, Bronopol, Kasugamycin, Copper oxychloride and Cuprous oxide, all of which are well-known products available for combating plant bacterial diseases. The procedures followed in these trials are described in the detailed Examples below.

EXAMPLE 2

This example illustrates the activity of the tetramisole against the disease organism *Erwinia amylovora* (fireblight of apples and pears).

Pear trees were sprayed to "run off" (i.e. so that the leaves were thoroughly wetted and liquid just began to run off them), with six fortnightly applications of tetramisole formulated as set out in Example 11 and compared with streptomycin applied similarly at the standard recommended rate for that compound. Assessment of the number of leaves showing disease symptoms was made on 100 branches per treatment and expressed as a percentage of the total number of leaves thereon.

The results are expressed in the table below

| Compound | Rate of application (p.p.m.) | Percentage number of leaves infected |
|---|---|---|
| Tetramisole | 250 | 36 |
| Streptomycin | 100 | 78 |
| Control (untreated) | | 60 |

The above table clearly shows the efficacy of tetramisole, whilst streptomycin was virtually ineffective, producing a poorer result than the control by permitting greater infection.

EXAMPLE 3

This example illustrates the activity of tetramisole against the disease organism *Xanthomonas malvacearum* (Blackarm of cotton).

A batch of cotton seed was dressed with the formulation Example 11 dispersed in water after having been artificially inoculated by soaking in a bacterial suspension of the disease organism. These seeds were then sown in four replicates of 100 seeds per treatment and the seedlings assessed on emergence for disease.

The results are set out in the table below. Comparisons were made with seed treated with cuprous oxide, bronopol and an untreated control.

| Compound | Rate of application (p.p.m.) | Emergence as a percentage of the untreated control | Percentage seedling plants diseased | No. of healthy plants as a percentage of the untreated control |
|---|---|---|---|---|
| Tetramisole | 1,000 | 102 | 30 | 233 |
| Cuprous oxide | 4,500 | 92 | 48 | 146 |
| Bronopol | 1,000 | 106 | 45 | 156 |
| Untreated control | | 100 | 70 | 100 |

The superiority of tetramisole is clearly apparent from the above results and no further comment is needed.

EXAMPLE 4

This example illustrates the efficacy of tetramisole (Compound No. 2 of Table 1, page 15) against *Pseudomonas phaseolicola* (haloblight of beans).

A batch of bean seed dressed with the formulation of Example 9, of which 25% of the beans were artificially inoculated with the haloblight organism, were planted, one hundred seeds in four replicates per treatment. When the seedlings had emerged the number of seedlings which had signs of the primary disease symptoms were assessed. Two weeks later the number of primary symptoms was again assessed together with the number of secondary symptoms which had resulted from infection arising from these primary symptoms. This *systemic* seed dressing treatment was compared with a standard spray treatment using cuprous oxide applied at the same time as the first assessment.

The results are expressed in the table below.

| Compound | Rate of application (p.p.m.) | First assessment, percent No. | | Second assessment, percent No. | | |
|---|---|---|---|---|---|---|
| | | Plants emerged | Primary symptoms | Plants emerged | Primary symptoms | Secondary symptoms |
| Tetramisole (seed dressing) | 2,000 | 51 | 5.7 | 55.7 | 10.2 | 0.0 |
| Cuprous oxide (spray) | 2,000 | | | 34.0 | 6.5 | 0.0 |
| Agrimycin (seed dressing) | 1,000 | 57.5 | 6.7 | 55.5 | 6.8 | 2.7 |
| Bronopol (seed dressing) | 2,000 | 49.0 | 7.0 | 51.0 | 9.8 | 0.5 |
| Kasugamycin | 750 | 42.7 | 5.7 | 45.5 | 11.2 | 1.5 |
| Control untreated | | 47.6 | 6.6 | 43.5 | 9.1 | 0.5 |

These results show that tetramisole greatly improves plant emergence, reduce primary symptoms at the outset and protects the seedlings against secondary symptoms. None of the established standard products achieves all these benefits in combination.

EXAMPLE 5

This example illustrates the activity of tetramisole against the disease *Pseudomonas mors-prunorum* (cherry canker). Cherry trees (small root stocks) were sprayed with the formulation of Example 11 dispersed in water and two weeks later the youngest four leaves of ten plants (five blocks of two plants) were assessed for the shothole symptom, and also phytotoxicity which was recorded on a 0 to 5 scale, 0 indicating no damage and 5 death of leaves. The results are expressed in the table below.

| Compound | Rate of application (p.p.m.) | Number of shotholed leaves per tree | Phytotoxicity grade |
|---|---|---|---|
| Tetramisole | 500 | 2.00 | 0.9 |
| Cuprous oxide | 2,500 | 2.90 | 3.80 |
| Untreated control | | 2.90 | 110 |

These results show that tetramisole is considerably more effective than a standard treatment (cuprous oxide) and much less phytotoxic.

EXAMPLE 6

This example illustrates the activity of the disease organism *Xanthomonas vesicatoria* (bacterial spot of Tomatoes and Peppers).

Tomato plants (variety Indian River) were sprayed with a formulation containing 100 p.p.m. of tetramisole one month after planting and a further five sprays were applied fortnightly thereafter. The whole trial was sprayed with insecticide and fungicide to control these other pests. Disease severity was assessed monthly from the third spray application on a 0 to 10 scale estimating the incidence of spot on the leaves, stems and fruit in each plant.

The results are given in the Table below. Comparisons were made with copper oxychloride and bronopol at the rates indicated.

| Compound | Rate of application | Disease severity assessment No. | | | Percent of diseased fruit |
|---|---|---|---|---|---|
| Tetramisole | 100 | 1.2 | 1.0 | 2.3 | 24.0 |
| Copper oxychloride | 2,000 | 1.2 | 0.6 | 1.3 | 10.7 |
| Bronopol | 400 | 1.0 | 2.4 | 3.3 | 41.7 |
| Untreated control | | 1.2 | 1.4 | 3.8 | 42.4 |

This example illustrates the use of cream and paste formulations of tetramisole to combat the disease organin in reducing the disease.

In practice higher rates, nearer to those used for copper oxychloride, would be applied. In the test it took the latter at a concentration of twenty-five times the concentration of tetramisole to achieve approximately of the order of two and one half times the benefit.

EXAMPLE 7

This example illustrates the use of cream and paste formulations of tetramisole to combat the disease organisms *Erwinia amylovora* (firelight on pears) and *Pseudomonas lachrymans* (angular leaf spot on cucumbers).

Two formulations were applied—a 2.5% paste and a 2.5% cream. That is 2.5% active compound was present in each formulation. Forty milligrams of cream or paste (i.e. one milligram of the active compound) were applied to the stems of pear and cucumber seedlings. This would be equivalent to the maximum taken up from 10 millilitres of a solution containing 100 parts per million of tetramisole which had previously been found to be effective against these diseases.

Two replicates were treated per plant per formulation and compared with an untreated control. The stems of all the plants were surrounded by cotton wool at their bases before treatment to prevent the formulation from running into the soil and so being taken up therefrom by the seedling plant roots.

The plants were inoculated in the usual way twenty-four hours after the chemical was applied and they were allowed to remain in the glasshouse and assessed for disease symptoms in due course on a 0 to 3 scale where 0 is no control of the disease and 3 represents complete disease control.

The results of these tests are summarized in the table below.

*Erwinia amylovora* on pears

| Treatment compound | Disease assessment | Phytotoxicity |
|---|---|---|
| Tetramisole cream: | | |
| Replicate 1 | 2.16 | 0 |
| Replicate 2 | 3.00 | 0 |
| Tetramisole paste: | | |
| Replicate 1 | 1.00 | 0 |
| Replicate 2 | 2.00 | 0 |
| Untreated control: | | |
| Replicate 1 | 0 | 0 |
| Replicate 2 | 0 | 0 |

*Pseudomonas lachrymans* on cucumber

| Treatment compound | Disease assessment | Phytotoxicity |
|---|---|---|
| Tetramisole cream | 1.0 | 0 |
| Untreated control | 0.5 | 0 |

N.B. Phytotoxicity is expressed in the two tables above on a 0 to 5 scale where 0 indicates no phytotoxicity and 5 indicates plant death.

The results indicate clearly that tetramisole is *systemically* active when applied to the stems of plants. That is to say it is taken up by the plant and transmitted through it to combat bacterial infection elsewhere upon the plant.

EXAMPLE 8

5 Parts by weight of tetramisole where thoroughly mixed in a suitable mixer with 95 parts by weight of talc. There was thus obtained a dusting powder.

EXAMPLE 9

This Example illustrates a water-soluble powder. The ingredients listed below were mixed in the proportions stated:

| | Percent |
|---|---|
| Tetramisole | 25 |
| "Lubrol" L | 5 |
| "Natrasol" 250L | 1 |
| Anhydrous Magnesium Sulphate | 69 |

EXAMPLE 10

The ingredients listed below were ground together in the proportions stated to produce a powdered mixture readily dispersible in liquids.

| | Percent wt. |
|---|---|
| Tetramisole | 50 |
| Dispersol T ("Dispersol" is a Trade Mark) | 5 |
| China Clay | 45 |
| | 100 |

EXAMPLE 11

This Example illustrates a dispersible powder formulation comprising tetramisole and a mixture of surface active agents. The ingredients listed below in the recited proportions were mixed together.

| | Percent wt. |
|---|---|
| Tetramisole | 25 |
| "Fenopon" T77 | 2 |
| "Dispersol" T ("Dispersol" is a Trade Mark) | 5 |
| China Clay | 68 |
| | 100 |

EXAMPLE 12

A composition suitable for use as a seed dressing was prepared by mixing all three of the ingredients set out below in the proportions stated.

| | Percent wt. |
|---|---|
| Tetramisole | 80 |
| Mineral Oil | 2 |
| China Clay | 18 |
| | 100 |

EXAMPLE 13

A granular composition was prepared by dissolving the active ingredient in a solvent, spraying the solution obtained on to the granules of pumice and allowing the solvent to evaporate.

| | Percent wt. |
|---|---|
| Tetramisole | 5 |
| Pumice Granules | 95 |
| | 100 |

EXAMPLE 14

An aqueous dispersion formulation was prepared by mixing and grinding the ingredients recited below in the proportions stated.

| | Percent wt. |
|---|---|
| Tetramisole | 40 |
| Calcium lignosulphonate | 10 |
| Water | 50 |
| | 100 |

The following constitutes an explanation of the compositions or substances represented by the various Trade Marks and Trade Names referred to in the foregoing Examples.

| | |
|---|---|
| "Natrasol" 250L | Is an hydroxyethyl cellulose. |
| "Lubrol" L | Is a condensate of 1 mole of nonyl phenol with 13 molar proportions of ethylene oxide. |
| "Aromasol" H | Is a solvent mixture of alkylbenzenes. |
| "Dispersol" T | Is a mixture of sodium sulphate and a condensate of formaldehyde with the sodium salt of naphthalene sulphonic acid. |
| "Lissapol" NX | Is a condensate of 1 mole of nonyl phenol with 8 moles of ethylene oxide. |
| "Fenopon" T 77 | Is a surface active agent containing sodium N-methyl-N-oleoyltaurates. |

EXAMPLE 15

This Example illustrates the preparation of various acid addition salts of tetramisole free base.

(a) Preparation of the oxalate, citrate or tartrate salts

To a solution of 2 parts of dl tetramisole in 20 parts of 2-propanol is added with stirring 1.2 parts of oxalic acid $2H_2O$ dissolved in 2-propanol. Recrystallised from ethanol, m.p. 185–186°. Following this procedure, but using citric and tartaric acids instead of oxalic acid the citrate and tartrate salts were prepared. The citrate and tartrates are hygroscopic.

(b) Preparation of the nitrate salt

The nitrate salt of tetramisole is prepared by dissolving 2 parts of tetramisole in 20 parts dry tetrahydrofuran and reacting in the cold with 1 part of concentrated nitric acid dissolved in 5 ml. of tetrahydrofuran. The yellow suspension is stirred for 1½ hours at room temperature. The nitrate salt is filtered, washed with tetrahydrofuran and dried, m.p. 168–168.5°.

We claim:

1. A method of combating bacteria which infests plants, seeds or soil which comprises applying to said plants, seeds or soil a bactericidally effective amount of a compound having the formula:

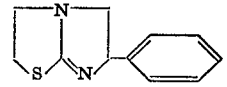

or acid-addition salt thereof.

2. The method of Claim 1 wherein the compound is in the form of an acid addition salt.

3. The method of Claim 2 wherein the acid addition salt is the hydrochloride.

References Cited

FOREIGN PATENTS 1,043,489   9/1966   Great Britain.

OTHER REFERENCES

Raeymaekers et al., J. Med. Chem., 1966, 9, pp. 545–551.

Thienpont et al., Nature, 1966, 209, pp. 1084–1086.

ALBERT T. MEYERS, Primary Examiner

A. J. ROBINSON, Assistant Examiner

U.S. Cl. X.R.

424—Dig. 8